United States Patent

[11] 3,587,225

[72] Inventor Irving Keiser
 1630 Makiki Street
 Honolulu, Hawaii 96822
[21] Appl. No. 5,188
[22] Filed Jan. 23, 1970
[45] Patented June 28, 1971

[54] EARTH TIME COMPARATOR
 9 Claims, 9 Drawing Figs.
[52] U.S. Cl. ........................................... 58/43,
 58/127
[51] Int. Cl. ...................................... G04b 19/22
[50] Field of Search ............................. 58/42.5, 43,
 127

[56] References Cited
 UNITED STATES PATENTS
2,169,956 8/1939 Leatart .......................... 58/43

2,395,643 2/1946 Ramsay ........................ 58/43
Primary Examiner—Richard B. Wilkinson
Assistant Examiner—Edith C. Simmons
Attorney—Shlesinger, Arkwright and Garvey ABSTRACT: This invention is an earth time comparator for providing a comparison of clock time in relation to points in different selected reference time zones, both with respect to day and night hour times and designation of the particular day in comparison with a place of reference. The comparator includes a stationary disc radially divided into the 24 global time zones. A rotatable disc is axially mounted in a central, complemental recess formed in the stationary disc, which rotatable disc is radially divided into 24 zones representing the 24 hours in a day. Movement of the rotatable disc actuates day-indicating assemblies to indicate the day with respect to the place of reference, i.e. "yesterday", "today" or "tomorrow".

INVENTOR.
Irving Keiser

INVENTOR
Irving Keiser

ATTORNEYS

PATENTED JUN28 1971 3,587,225
SHEET 3 OF 3
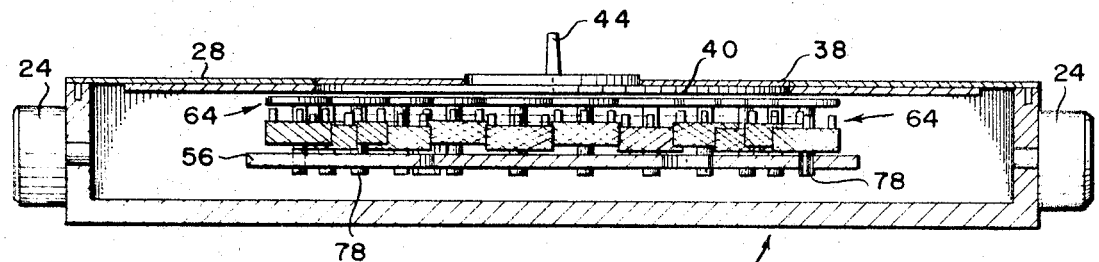
Fig.4
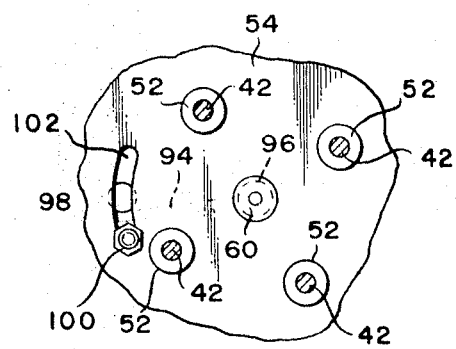
Fig.8
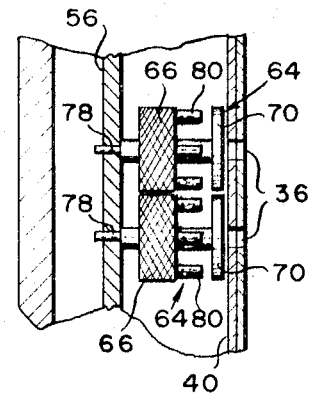
Fig.7
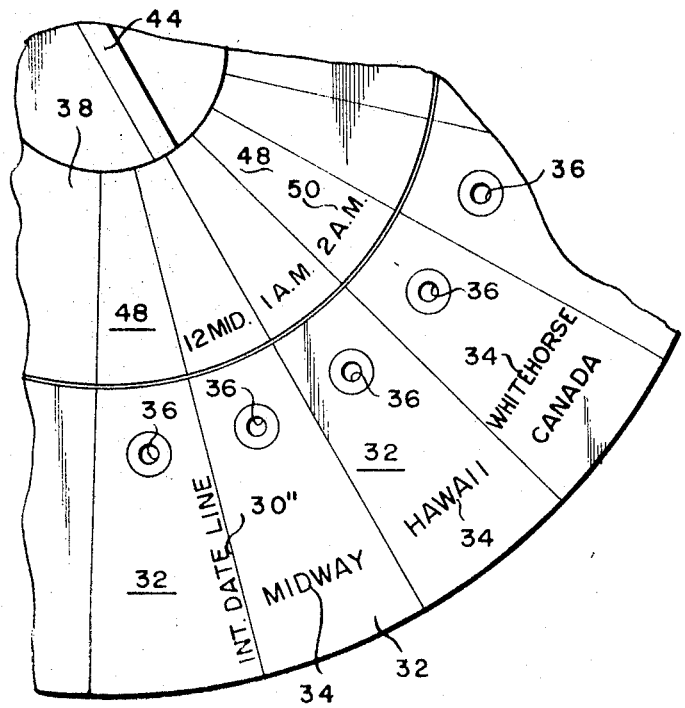
Fig.3
Fig.9
INVENTOR
Irving Keiser
BY
ATTORNEYS

_3,587,225_

EARTH TIME COMPARATOR

OBJECTS AND DESCRIPTION OF FIGURES OF DRAWINGS

It is an object of this invention to provide an earth time comparator for directly indicating the simultaneous clock and day times in different global time zones and for affording a ready comparison therebetween.

Another object is to provide an earth time comparator having relatively movable parts for directly indicating the time in any of the global time zones with reference to a particular reference place at any time of the day or night.

A further object is to provide an earth time comparator including a stationary disc divided into the global time zones, each time zone bearing the name of a particular country or city within the time zone, a rotatable disc centrally and axially mounted within the stationary disc, the rotatable disc being radially divided into 24 zones representing the 24 hours in a day, and day-indicating assemblies located proximate the outer periphery of the rotatable disc, one for each of the zones, each day-indicating assembly including a disc divided into three segments, each bearing different indicia or colors for designating "yesterday," "today" or "tomorrow," the day-indicating assembly being directly rotatable by the rotatable disc upon actuation of the latter.

Other objects will be manifest from the following description of the presently preferred form of the present invention taken in connection with the appended drawings, wherein:

FIG. 3 is an enlarged, fragmentary front elevational view of the earth time comparator, showing to advantage several segments of the stationary and rotatable discs;

FIG. 4 is a sectional view taken along line 4—4 of FIG. 1, looking in the direction of the arrows;

FIG. 7 is a sectional view taken along the lines 7—7 of FIG. 2, looking in the direction of the arrows;

FIG. 8 is a fragmentary front elevational view of the earth time comparator, showing to advantage the day-indicating stop means, and FIG. 9 is a perspective view of a day-indicating assembly per se.

DETAILED DESCRIPTION OF INVENTION

Figure 1:
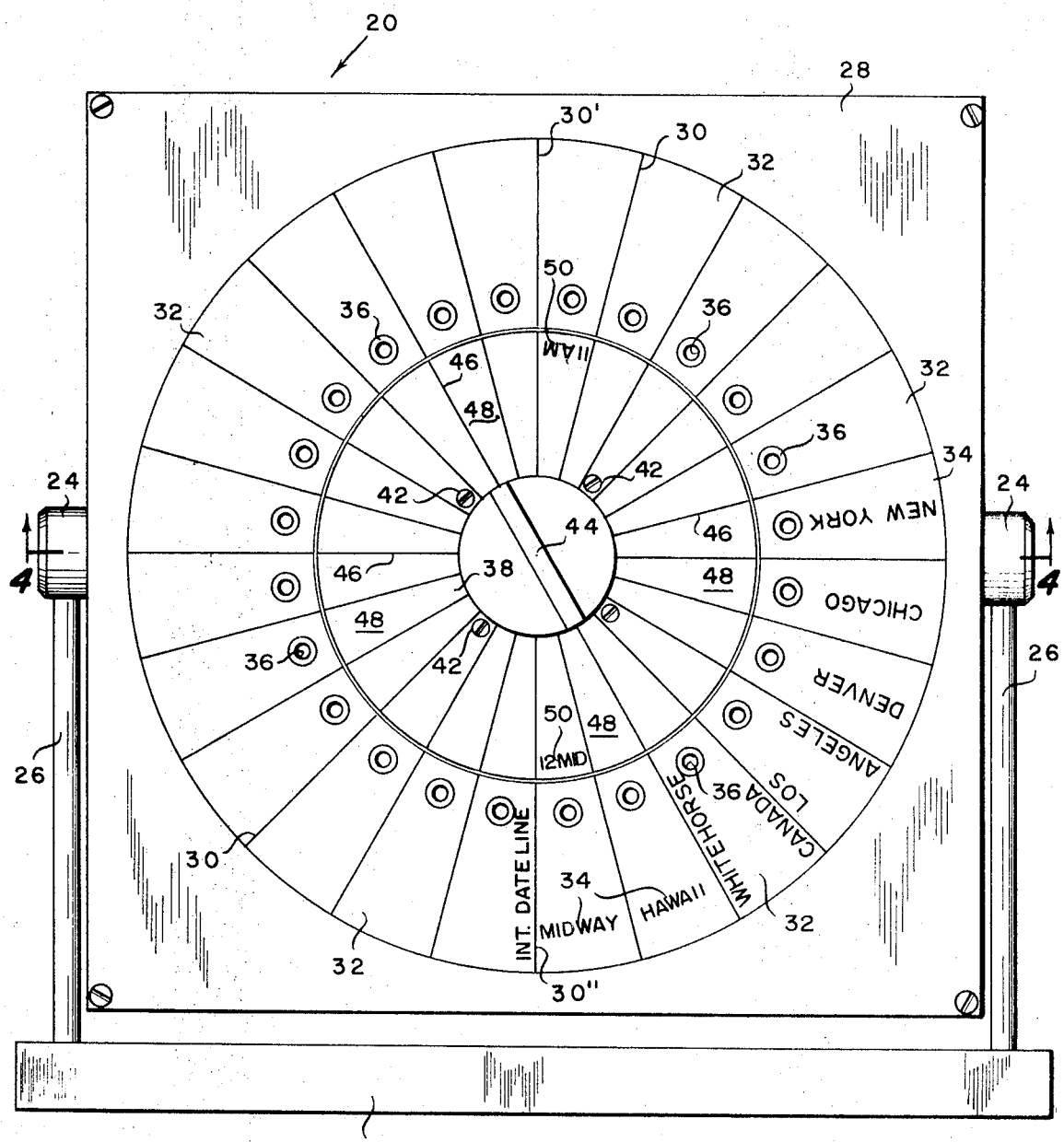
FIG. 1 is a front elevational view of the earth time comparator of the present invention.

The earth time comparator of the present invention includes a housing 20 which is hingedly supported on a base 22 by means of lateral trunnions 24 and supporting standards 26.

The front of housing 20 is covered by a panel member 28, which is radially scored from the center outwardly by lines 30 to form 24 zones 32 of 15° each, corresponding to the 24 global time zones. The Greenwich meridian line is indicated at 30' and the International Date line at 30''. Indicia 34 are printed or otherwise affixed to each zone 32, the indicia designating a country or a city within a particular time zone represented by the zone. Each zone is further provided with an opening or window 36 for purposes which will be hereinafter more fully set out.

A circular portion of panel member 28 is cut out in order to receive a complemental rotatable disc 38 which is mounted on a base plate 40, the disc and base plate being fixedly secured together by screws or other suitable means 42. A knob or actuating member 44 extends outwardly from the center of rotatable disc 38 for rotating disc 38 and plate 40. Rotatable disc 38 is radially divided by lines 46 into 24 zones designated 48. Each zone bears indicia 50 corresponding to each of the hours of the day.

Screws 42 which extend through rotatable disc 38 and base plate 40 are threadedly engaged with upstanding lugs 52 which are fixedly secured to the face of a disc 54 which lies in spaced parallel relationship to the face of rotatable disc 38.

Figure 5:
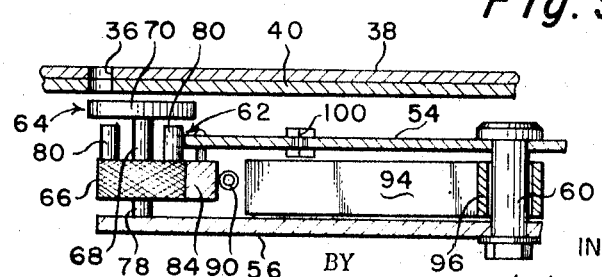
FIG. 5 is an enlarged, fragmentary sectional view similar to FIG. 4, showing to advantage the mechanism for actuating the day-indicating assembly.

As shown in FIG. 5, disc 54 is mounted in spaced rotatable relationship with respect to a fixed lower plate 56. Disc 54 is in spaced rotatable relationship with respect to plate 56 by means of a journal pin 60. Therefore, upon rotation of knob 44, disc 54 is rotated by virtue of the connection of disc 38 to disc 54 by screws 42.

The outer periphery of disc 54 is provided with an inwardly directed slot 62 adapted for selective engagement with a plurality of rotatable day-indicating assemblies 64.

One day-indicating assembly 64 is provided for each of the 24 zones designated in disc 38. Each assembly includes a lower knurled disc 66 which is connected by a central pin 68 to an upper disc 70, the terminals of the pin being fixed to discs 66 and 70 to effect rotation of the latter upon exertion of rotative forces on the former. The upper surface of disc 70 is divided into three segments of equal size designated 72, 74 and 76 which may be either provided with printed indicia, or as illustrated in the drawings, color codes designating respectively "yesterday," "today" and "tomorrow."

A stub shaft 78 extends from the central lower face of knurled disc 66, the lower terminal of the stub shaft being rotatably mounted in a complemental opening in disc 56.

Three equally spaced pins 80 extend upwardly from the upper face of knurled knob 66, near the outer periphery thereof, which pins are adapted for engagement in slot 62, to effect selective rotation of a day-indicating assembly 64 upon actuation of disc 38.

In order to insure proper engagement of selected pin 80 in recess 62, and disengagement therefrom, there is additionally provided an advancing arm 82 which is pivotally connected at 84 to the undersurface of disc 54. Advancing arm 82 is further provided with a curvilinear friction member 86 adapted for frictional engagement with knurled knob 66 of day-indicating assembly 64. Laterally of one terminal of advancing arm 82, there is provided an ear 88 to which is attached a tensioning spring 90, the opposite end of which is secured to disc 38 at 92 to insure constant urging of arm 82 against successive knurled discs 66.

It is further within the contemplation of the present invention to provide means for maintaining the required like sequential adjustments of day-indicating assemblies 64. For this purpose, there is provided a stop arm 94, the inner terminal of which is connected to a collar 96 which is loosely engaged over pin 60 and rotatable independently thereof. In conjunction with stop arm 94 there is provided a fixed stop member 98 which is secured to the upper face of disc 56 in a path of movement of stop arm 94.

A movable stop member 100 is slidably retained in an arcuate slot 102, the movable spot also being located in the path of stop arm 94. Slot 102 preferably extends through an arc of approximately 30°.

With this arrangement disc 38 is permitted to rotate through two complete revolutions from its "noon" zone 30' in a clockwise or counterclockwise direction before being stopped by arm 94. However, disc 38 may be rotatively adjusted in either desired direction within the full utility range, for different comparator readings. The direction of rotation of disc 38 must then be reversed in order to retain the proper sequential positioning of day-indicating assemblies 64.

OPERATION

In use of the device of the present invention, disc 38 is rotated by operation of knob 44 until time indicia 50 of selected segment 48 of the rotating disc is aligned with the selected place indicia 34 of segment 32. At this time, only a single segment, either 72, 74 or 76 of disc 70 forming a part of day-indicating assemblies are visible through windows 36. Therefore, simply by looking through the windows 36, it can immediately be ascertained whether the relative time with respect to any place in the 24 global zones is "yesterday," "today" or "tomorrow." As indicated, segments 72, 74 and 76 are color coded, but other identifying indicia may be used as well.

In order to change the time segment 48 with respect to place segment 32, disc 38 is rotated until there is alignment of the selected time 50 with the selected place 34. Upon rotation of disc 38, peripheral slot 62 of disc 54 engages adjacent pin 80 and friction member 86 engages knurled disc 66. Rotation of disc 54 thereby effects rotation of selected day-indicating assembly 64 through a one-third revolution. This serves to relocate segments 72, 74 and 76 so that different identifying indicia is visible through window 36.

Figure 2:
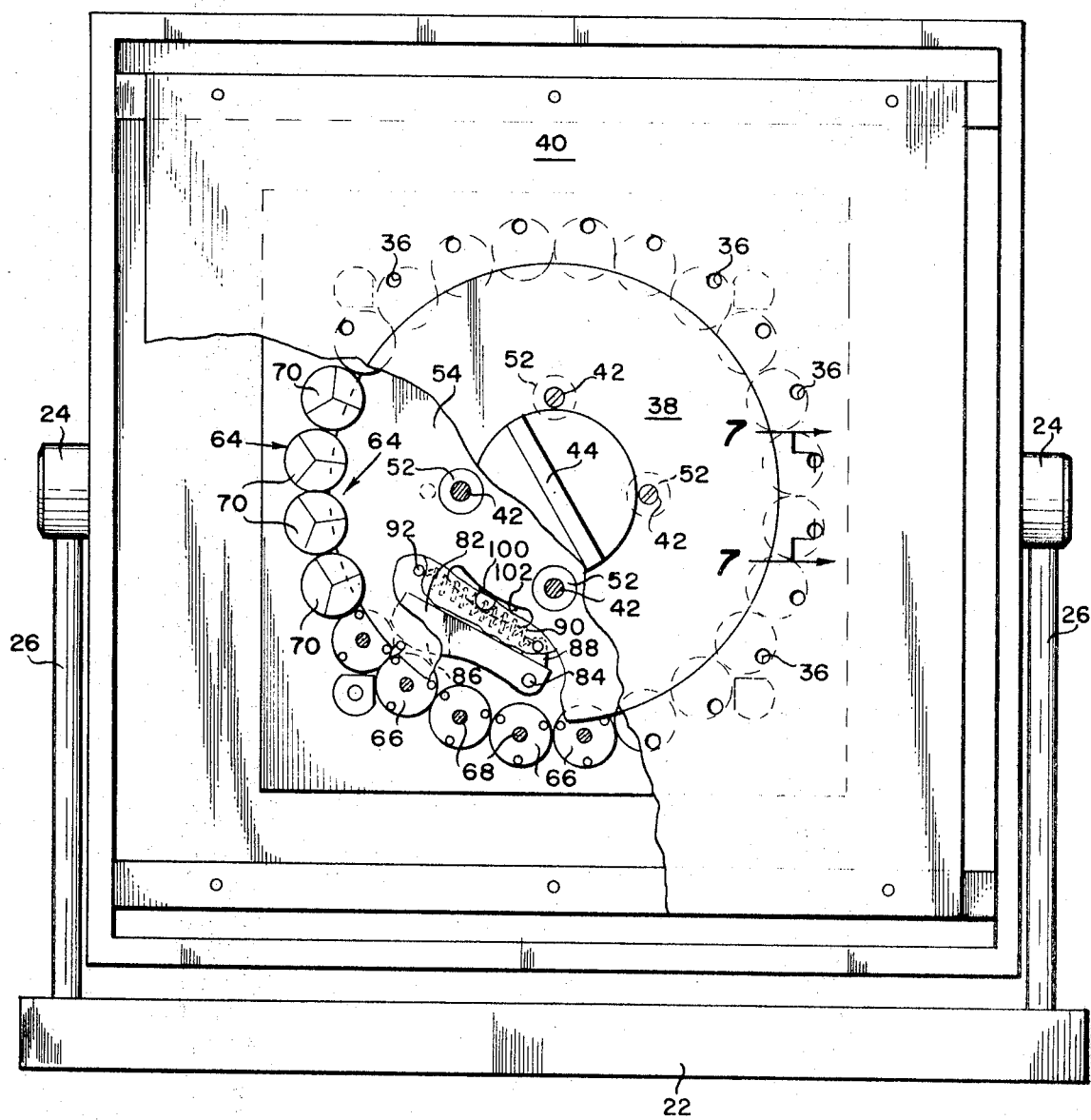
FIG. 2 is a view similar to FIG. 1, portions thereof being removed and broken away to disclose details of construction.
Figure 6:
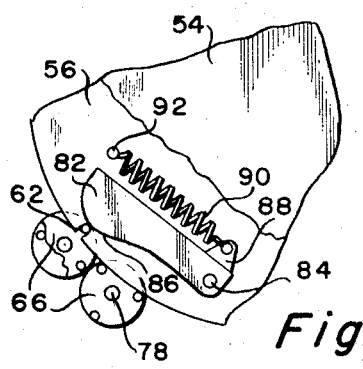
FIG. 6 is a plan view disclosing auxiliary means for rotating the day-indicating assemblies.

Day indicating assemblies 64 are sequentially and progressively rotated by virtue of slot 62 and friction member 82 in a manner which will be apparent from a consideration of FIG. 2.

Rotatable disc 38 may be rotated through two complete revolutions before stop arm 94 is prevented from further rotation by stop 98 acting in conjunction with movable stop member 100, following which the direction of rotation of knob 44 must be reversed in order to maintain the proper sequential relationship.

I claim:
1. An earth time comparator including:
   a. a housing
   b. a stationary plate member covering one face of said housing,
   c. said stationary plate member being radially divided from the center outwardly to form zones corresponding to reference locations on the earth lying in different time zones,
   d. each of said zones being provided with an opening providing a window,
   e. said stationary plate member being provided with a central opening,
   f. a disc rotatably mounted in the central opening of said stationary plate member,
   g. said rotatable disc being radially divided into zones corresponding to clock times,
   h. means for actuating said rotatable disc for selectively aligning the desired clock time with a particular reference location zone on the earth,
   i. day-indicating assemblies rotatably mounted in said housing proximate the outer periphery of said rotatable disc,
   j. the upper surface of said day-indicating assemblies being divided into segments,
   k. each of said zones having different markings representing "yesterday," "today" and "tomorrow," which are selectively visible through the windows of said stationary plate member,
   l. plate means connected to, and rotatable with, said rotatable disc,
   m. actuating means carried by said plate means for selective engagement with said day-indicating assemblies,
   n. whereby said selected day-indicating assembly is rotated through a predetermined arc by said actuating means when said rotatable disc is rotated, to change the zone of the day-indicating assembly which is visible through the window of said stationary plate member zone.

2. The earth time comparator of claim 1, wherein said actuating means comprises:
   a. a slot extending inwardly from the outer periphery of said plate means,
   b. each of said day-indicating assemblies including a plurality of equally spaced pins proximate the outer periphery thereof,
   c. the pins of each day-indicating assembly selectively entering the slot in said plate means, and
   d. means on said plate means selectively engageable with said day-indicating assemblies for rotating the latter upon actuation of the former, to position one of said pins for entry into the slot.

3. The earth time comparator of claim 2, wherein said means on said plate means comprises:
   a. a friction member urged against a portion of one of said day-indicating assemblies.

4. The earth time comparator of claim 1, with the addition of:
   a. a stop arm independently rotatably mounted in said housing beneath, and axially of, said plate means,
   b. a fixed stop carried by said housing in the path of movement of said stop arm,
   c. a movable stop pending from said plate means in the path of movement of said stop arm,
   d. whereby two revolutions of said plate means and connected movable disc are permitted before the engagement of said stop arm with said fixed stop and movable stop prevents further rotation, to maintain the required like sequential adjustments of said day-indicating assemblies.

5. The earth time comparator of claim 1, wherein each of said day-indicating assemblies includes:
   a. a pin,
   b. a lower disc axially fixed to one end of said pin,
   c. an upper disc in spaced, parallel relation to said lower disc and axially fixed to the opposite end of said pin,
   d. the upper face of said disc being radially divided into a plurality of segments, of equal size, and
   e. different identifying indicia applied to each of said segments, designating "yesterday," "today" and "tomorrow."

6. The earth time comparator of claim 5, wherein:
   a. said different identifying indicia is a color code.

7. The earth time comparator of claim 1, wherein:
   a. the outer periphery of said lower disc of said day-indicating member assembly is provided with a friction surface, and with the addition of,
   b. an advancing arm pivotally connected to the undersurface of said plate means,
   c. a portion of said advancing arm including a friction member engageable with the friction surface of said lower disc, and
   d. spring means for urging said advancing arm into engagement with said lower disc.

8. An earth time comparator including:
   a. a housing,
   b. a stationary plate member covering one face of said housing,
   c. said stationary plate member being radially divided from the center outwardly to form zones corresponding to reference locations on the earth lying in different time zones,
   d. each of said zones being provided with an opening providing a window,
   e. said stationary plate member being provided with a central opening,
   f. a disc rotatably mounted in the central opening of said stationary plate member,
   g. said rotatable disc being radially divided into zones corresponding to clock times,
   h. means for actuating said rotatable disc for selectively aligning the desired clock time with a particular reference location zone on the earth,
   i. plate means within the housing connected to and rotatable with, said rotatable disc,
   j. day-indicating assemblies rotatably mounted in said housing proximate the outer periphery of said rotatable disc,
   k. each of said day-indicating assemblies including a pin,
   l. a lower disc axially fixed to one end of said pin,
   m. an upper disc in spaced parallel relation to said lower disc and axially fixed to the opposite end of said pin,
   n. the upper face of said disc being radially divided into three segments of equal size,
   o. different identifying indicia applied to each of said segments, designating "yesterday," "today " and "tomorrow,"

p. the outer periphery of said lower disc being provided with a friction surface,
q. an advancing arm pivotally connected to the undersurface of said plate means,
r. a portion of said advancing including a friction member engageable with the friction surface of said lower disc, and
s. spring means for urging said advancing arm into engagement with said lower disc.

9. The earth time comparator of claim 8, with the addition of:
a. a stop arm independently rotatably mounted in said housing beneath, and axially of, said plate means,
b. a fixed stop carried by said housing in the path of movement of said stop arm,
c. said plate means being provided with an arcuate slot internally of the periphery thereof and lying in the path of movement of said stop arm,
d. a movable stop slidably carried in the arcuate slot of said plate means,
e. whereby two revolutions of said plate means and connected rotatable disc are permitted before the engagement of said stop arm with said fixed stop and movable stop, to maintain the required like sequential adjustments of said day-indicating assemblies.